UNITED STATES PATENT OFFICE.

HENRY A. TILDEN, OF NEW LEBANON, NEW YORK.

IMPROVEMENT IN DISINFECTING COMPOUNDS.

Specification forming part of Letters Patent No. 121,913, dated December 12, 1871.

*To all whom it may concern:*

Be it known that I, HENRY A. TILDEN, of the town of New Lebanon, in the county of Columbia and State of New York, have invented an Improved Compound for Disinfecting, Deodorizing, Preserving, and other purposes; and the following is declared to be a correct description thereof.

My compound is prepared from bromine, chlorine, aluminium, and carbon, and possesses powerful alterative, antiseptic, deodorizing, disinfecting, preserving, and absorbent properties. The several articles alone possess to a certain degree the properties mentioned; but I have discovered that when bromide or chloride of aluminium, either alone or combined, are united with carbon the above-enumerated powers are largely increased or developed, producing an article that possesses remarkable properties for the uses and purposes heretofore stated.

My compound is prepared by the action of chloride of aluminium and bromide of aluminium, either together, separately, or alternately, upon animal or vegetable carbon, completely saturating the same, which can be used either in a dry or moist state.

It may consist of sixteen parts of bromide of aluminium and thirty-four parts of chloride of aluminium, with fifty parts of carbon; if employed separately, of fifty parts of chloride of aluminium and fifty parts of carbon, or thirty-four parts bromide aluminium and sixty-six parts of carbon, dependent somewhat upon the absorbent condition of the carbon and whether employed cold or heated.

The above results may be produced by direct combination of the salts with the carbon, or successively or indirectly by decomposition from any salts containing the elements of the same, or from any resulting waste products or waters in chemical or industrial works, or from any natural waters that may contain either bromine, chlorine, iodine, or aluminium, or salts of the same.

Iodine may be added to this compound; but I do not limit myself to its use. I do not limit myself to the use in this combination of carbon alone, as peat, asbestus, common earth, or any substance that presents increased absorbent power may be used.

I claim as my invention—

The compound herein specified, prepared and employed substantially as and for the purposes set forth.

Signed by me this 27th day of October, A. D. 1871.

H. A. TILDEN.

Witnesses:
   JAMES WALLACE,
   A. H. BEMENT. (98)